(12) United States Patent
Nakayama et al.

(10) Patent No.: US 10,516,164 B2
(45) Date of Patent: Dec. 24, 2019

(54) CATHODE ACTIVE MATERIAL FOR NON-AQUEOUS ELECTROLYTE SECONDARY BATTERY AND MANUFACTURING METHOD THEREOF

(71) Applicant: SUMITOMO METAL MINING CO., LTD., Tokyo (JP)

(72) Inventors: Tomoko Nakayama, Ehime (JP); Rei Kokado, Ehime (JP); Kensaku Mori, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/034,586

(22) Filed: Jul. 13, 2018

(65) Prior Publication Data

US 2018/0323428 A1    Nov. 8, 2018

Related U.S. Application Data

(62) Division of application No. 14/892,830, filed as application No. PCT/JP2014/063595 on May 22, 2014, now Pat. No. 10,056,610.

(30) Foreign Application Priority Data

May 22, 2013    (JP) .................................. 2013-107896

(51) Int. Cl.
*H01B 1/08*    (2006.01)
*H01M 4/485*    (2010.01)
(Continued)

(52) U.S. Cl.
CPC ............ *H01M 4/485* (2013.01); *C01G 53/42* (2013.01); *H01B 1/08* (2013.01); *H01M 4/525* (2013.01);
(Continued)

(58) Field of Classification Search
CPC .. H01M 4/485; H01M 4/525; H01M 10/0525; H01M 4/505; H01M 10/052;
(Continued)

(56) References Cited

U.S. PATENT DOCUMENTS

2007/0231691 A1    10/2007    Abe et al.
2007/0231694 A1    10/2007    Abe et al.
(Continued)

FOREIGN PATENT DOCUMENTS

JP    H05-242891 A    9/1993
JP    H09-231963 A    9/1997
(Continued)

OTHER PUBLICATIONS

International Search Report and Written Opinion dated Aug. 5, 2014, from the corresponding PCT/JP2014/063595.
(Continued)

*Primary Examiner* — Mark Kopec
*Assistant Examiner* — Jaison P Thomas
(74) *Attorney, Agent, or Firm* — Katten Muchin Rosenman LLP (57) ABSTRACT

The purpose of the present invention is to easily provide at low cost, a cathode active material for non-aqueous electrolyte secondary batteries, which exhibits high particle strength and high weather resistance, while enabling achievement of excellent charge and discharge capacity and excellent output characteristics in cases where the cathode active material is used as a cathode material of a non-aqueous electrolyte secondary battery. A slurry of from 500 g/L to 2000 g/L is formed by adding water to a powder of a lithium nickel composite oxide represented by the general formula (A): $Li_zNi_{1-x-y}Co_xM_yO_2$, where $0.10 \leq x \leq 0.20$, $0 \leq y \leq 0.10$, $0.97 \leq z \leq 1.20$, and M represents at least one element selected from among Mn, V, Mg, Mo, Nb, Ti and Al);

(Continued)

the slurry is washed with water by stirring; and after filtration, the resulting material is subjected to a heat treatment at a temperature of from 120° C. to 550° C. (inclusive) in an oxygen atmosphere having an oxygen concentration of 80% by volume or more.

5 Claims, 1 Drawing Sheet

(51) Int. Cl.
  *H01M 4/525* (2010.01)
  *C01G 53/00* (2006.01)
  *H01M 10/0525* (2010.01)
  *H01M 4/505* (2010.01)
  *H01M 10/052* (2010.01)

(52) U.S. Cl.
  CPC ..... *H01M 10/0525* (2013.01); *C01P 2002/30* (2013.01); *C01P 2002/76* (2013.01); *C01P 2006/12* (2013.01); *H01M 4/505* (2013.01); *H01M 10/052* (2013.01); *H01M 2220/20* (2013.01); *H01M 2220/30* (2013.01)

(58) Field of Classification Search
  CPC .......... H01M 2220/20; H01M 2220/30; C01G 53/42; C01P 2002/30; C01P 2002/76; C01P 2006/12; H01B 1/08
  USPC ....................................................... 252/500
  See application file for complete search history.

(56) References Cited

U.S. PATENT DOCUMENTS

| | | |
|---|---|---|
| 2009/0029253 A1 | 1/2009 | Itou et al. |
| 2010/0099027 A1 | 4/2010 | Kikuya et al. |
| 2011/0256437 A1 | 10/2011 | Katsuki et al. |
| 2011/0281168 A1 | 11/2011 | Watanabe et al. |
| 2012/0119167 A1* | 5/2012 | Matsumoto ............ C01G 53/42 252/519.15 |
| 2012/0276454 A1 | 11/2012 | Mori et al. |
| 2012/0292561 A1 | 11/2012 | Sasaoka et al. |
| 2013/0078520 A1 | 3/2013 | Toya et al. |
| 2013/0119307 A1 | 5/2013 | Watanabe et al. |

FOREIGN PATENT DOCUMENTS

| | | |
|---|---|---|
| JP | 2003-017054 A | 1/2003 |
| JP | 2007-273106 A | 10/2007 |
| JP | 2007-273108 A | 10/2007 |
| JP | 2008-251532 A | 10/2008 |
| JP | 2010-155775 A | 7/2010 |
| JP | 2011-034861 A | 2/2011 |
| JP | 2011-228073 A | 11/2011 |
| WO | 2010/029745 A1 | 3/2010 |
| WO | 2011067937 | 6/2011 |
| WO | 2011/089958 A1 | 7/2011 |
| WO | 2011/155523 A1 | 12/2011 |

OTHER PUBLICATIONS

Notice of Allowance dated Apr. 23, 2018, from U.S. Appl. No. 14/892,830.
Non-Final Rejection dated Aug. 22, 2017, from U.S. Appl. No. 14/892,830.

* cited by examiner

CATHODE ACTIVE MATERIAL FOR NON-AQUEOUS ELECTROLYTE SECONDARY BATTERY AND MANUFACTURING METHOD THEREOF

TECHNICAL FIELD

The present invention relates to a cathode active material for a non-aqueous electrolyte secondary battery and manufacturing method thereof.

BACKGROUND ART

In recent years, with the spread of portable electronic devices such as notebook personal computers, cell phones and the like, there is a large need for development of compact and lightweight secondary batteries having a high energy density. Further, as a battery for an electric vehicle including a hybrid automobile, the development of a secondary battery having high output characteristics is strongly desired. As a non-aqueous electrolyte secondary battery that satisfies such needs, there is a lithium-ion secondary battery. A lithium-ion secondary battery has an anode, a cathode and an electrolyte, and as the active material of the anode and the cathode, a material is used for which desorption and adsorption of lithium is possible.

Currently, much research and development is being performed for lithium-ion secondary batteries, and particularly, lithium-ion batteries that use a layered or spinel type lithium composite oxide as the cathode active material can obtain a 4V class high voltage, so practical application as a battery having high energy density is advancing.

As the lithium composite oxide that is used as the cathode active material of a lithium-ion secondary battery, currently, lithium cobalt composite oxide ($LiCoO_2$) for which the composition is comparatively simple, lithium nickel composite oxide ($LiNiO_2$) that uses nickel that is less expensive than cobalt, lithium nickel cobalt manganese composite oxide ($LiNi_{1/3}Co_{1/3}Mn_{1/3}O_2$), lithium manganese composite oxide ($LiMn_2O_4$) that uses manganese and the like have been proposed.

Of these, lithium nickel composite oxide displays a large charge and discharge capacity, so it is expected to become a cathode active material from which a secondary battery having high energy density can be manufactured. However, pure lithium nickel composite oxide has problems with thermal stability and cycling characteristics in the charging state, and thus use as a practical battery would be very difficult.

Due to such a situation, an attempt was made to improve the thermal stability and cycling characteristics by replacing part of the nickel of particles of a lithium nickel composite oxide with other metal elements. For example, JPH05-242891 (A) discloses a lithium nickel composite oxide that is expressed by the general formula: $Li_aM_bNi_cCo_dO_e$ (where M is at least one metal that is selected from among Al, Mn, Sn, In, Fe, V, Cu, Mg, Ti, Zn and Mo, and $0<a<1.3$, $0.02 \le b \le 0.5$, $0.02 \le d/c+d \le 0.9$, and $1.8<e<2.2$, and $b+c+d=1$). By replacing part of the nickel of this lithium nickel composite oxide with a metal, particularly, Cu or Fe, it is possible to suppress change in the crystal structure, and to improve the discharge capacity and thermal stability of the secondary battery.

However, normally, unreacted lithium salts such as lithium carbonate, lithium nitrate and the like remain as impurities inside the lithium nickel composite oxide after formation. Therefore, when a secondary battery that uses this kind of lithium nickel composite oxide as a cathode active material is charged under high-temperature conditions, there is a possibility that the unreacted lithium salts will undergo oxidative decomposition. In that case, the generated decomposition gas may cause a problem of improper secondary battery dimensions or a decrease in the battery characteristics.

In the case of such problems, removing the lithium salts by washing the formed lithium nickel composite oxide with water and drying is effective. For example, JP2011-034861 (A), JP2003-017054 (A) and JP2007-273108 (A) disclose manufacturing methods of a lithium nickel composite oxide having a washing process that, by optimizing the amount of water used in washing and the amount of washing time, removes impurities such as lithium carbonate while suppressing the elution of lithium. In these manufacturing methods, after the washing process, it is necessary to perform heat treatment in an air atmosphere, non-carbon atmosphere, or vacuum atmosphere in order to remove the moisture content.

However, when heat treatment is performed in an air atmosphere, the lithium that exists on the surface of the lithium nickel composite oxide reacts with carbon in the air and becomes lithium carbonate, so it is not possible to solve the problem described above. On the other hand, when heat treatment is performed in a non-carbon atmosphere, or in a vacuum atmosphere, the generation of lithium carbonate is suppressed, however, part of the lithium that exists on the surface is proton-exchanged with the hydrogen ion in the washing solution, and results in a state close to an oxynickel oxide (NiOOH) state, so a problem occurs in that the electrical conductivity of the cathode active material that is obtained is impaired. Moreover, due to proton exchange, hydrogen is arranged in the site where the lithium was originally arranged, so there is also a problem in that during charging and discharging, the diffusion of lithium ions is obstructed, and the reaction resistance increases. Furthermore, due to washing with water, the strength of the cathode active material decreases, so a problem occurs in that the cathode active material cracks due to rolling pressure that is applied while forming the electrode, and the particles that are generated due to that become obstacles, so it becomes impossible to obtain a highly dense electrode.

In regard to this, JPH09-231963 (A) and JP2010-155775 (A) disclose technology in which after washing is performed under specified conditions, heat treatment is performed on the lithium nickel composite oxide in an oxygen atmosphere and at a temperature of 400° C. or greater. By performing heat treatment in an oxygen atmosphere in this way, it becomes possible to stabilize the crystallinity of the particle surfaces.

However, in the technology of the literature above, it is necessary to perform the washing of the lithium nickel composite oxide using pure water having mass that is two times or more than the mass of the lithium nickel composite oxide. Therefore, there is a possibility that a problem will occur in which the slurry concentration during washing becomes excessively low, and as the impurities are removed from the lithium nickel composite oxide, lithium is also extracted from inside the particles, and thus a decrease in the battery capacity and an increase in cathode resistance will occur due to lithium deficiency. Moreover, after the heat treatment, the amount of lithium on the surface decreases as compared to the amount of lithium inside the particles, so there is a possibility that a problem will occur in which the diffusion of lithium inside the cathode active material will become impaired, and that the conductive paths will become insufficient.

PATENT LITERATURE

| [Patent Literature 1] | JPH05-242891 (A) |
| [Patent Literature 2] | JP2011-034861 (A) |
| [Patent Literature 3] | JP2003-017054 (A) |
| [Patent Literature 4] | JP2007-273108 (A) |
| [Patent Literature 5] | JPH09-231963 (A) |
| [Patent Literature 6] | JP2010-155775 (A) |

SUMMARY OF INVENTION

Problem to be Solved by Invention

Taking the problems above into consideration, the object of the present invention is to provide a cathode active material for a non-aqueous electrolyte secondary battery easily and at low cost, and that when used as cathode material for a non-aqueous electrolyte secondary battery, not only has excellent charging and discharging capacity and output characteristics, but also has excellent particle strength and weather resistance.

Means for Solving Problems

The manufacturing method of a cathode active material for a non-aqueous electrolyte secondary battery of the present invention has steps of forming a 500 g/L to 2000 g/L slurry by adding water to a powder of a lithium nickel composite oxide that is represented by a general formula (A): $Li_zNi_{1-x-y}Co_xM_yO_2$, where $0.10 \leq x \leq 0.20$, $0 \leq y \leq 0.10$, $0.97 \leq z \leq 1.20$, and M is at least one element that is selected from among Mn, V, Mg, Mo, Nb, Ti and Al; washing the slurry by mixing; filtering the slurry; and performing heat treatment at a temperature of no less than 120° C. and no greater than 550° C., and preferably 120° C. or greater but less than 400° C. in an oxygen atmosphere having an oxygen concentration of 80% by volume or more.

Preferably, the temperature of the water that is used during washing is 10° C. to 50° C.

Preferably, the rate of temperature rise during heat treatment is 2° C./min to 10° C./min, and the moisture content after heat treatment is 0.2% by mass or less.

Moreover, the cathode active material for a non-aqueous electrolyte secondary battery of the present invention that is obtained by the manufacturing method above is a cathode active material that has a layered hexagonal lithium nickel composite oxide that is expressed by a general formula (B): $Li_zNi_{1-x-y}Co_xM_yO_2$, where $0.10 \leq x \leq 0.20$, $0 \leq y \leq 0.10$, $0.95 \leq z \leq 1.10$, and M is at least one element that is selected from among Mn, V, Mg, Mo, Nb, Ti and Al. The cathode active material of the present invention is such that a coating layer is formed on the surface thereof, and the composition ratio of lithium with respect to metal(s) other than lithium of that coating layer is 1.50 to 2.30. Preferably, there is no lithium deficiency in the coating layer.

Preferably, the specific surface area of the cathode active material is 0.2 g/m² to 2.0 g/m². Moreover, preferably the particle strength of the cathode active material is 42 MPa or more. Furthermore, preferably, the moisture content after cathode active material was exposed in an air atmosphere for 5 days is less than 1.1% by mass, and the total carbon amount is less than 0.6% by mass.

The non-aqueous electrolyte secondary battery of the present invention is formed using the cathode active material for a non-aqueous electrolyte secondary battery of the present invention described above.

Effect of Invention

With the present invention, when used as cathode material of a non-aqueous electrolyte secondary battery, it is possible to provide a cathode active material for a non-aqueous electrolyte secondary battery that has not only excellent charging and discharging capacity and output characteristics, but also has excellent particle strength and weather resistance. Moreover, by using this kind of cathode active material as cathode material, it is possible to provide a non-aqueous electrolyte secondary battery that has low cathode resistance, and high output. Furthermore, with the present invention, this kind of cathode active material can be easily produced on an industrial scale, so the industrial value is very large.

MODES FOR CARRYING OUT INVENTION

The inventors of the present invention, in order to solve the problems above, diligently performed research of lithium nickel composite oxide and a non-aqueous electrolyte secondary battery that uses that lithium nickel composite oxide as cathode active material. As a result, it was found that in the case of a cathode active material that is obtained by washing a lithium nickel composite oxide and then performing heat treatment in an oxygen atmosphere and at a specified temperature after the lithium carbonate and lithium nitrate on the surface of the lithium nickel composite oxide have been removed, the lithium on the surface that became deficient during washing is supplemented from the inside of the particles, resintering of the surface proceeds, and a coating layer is formed. It was also found that such a cathode active material not only has high particle strength due to the existence of the coating layer on the surface, but also has high resistance to weather (characteristic of not easily undergoing a change in quality due to atmospheric gases or carbon dioxide gas). Moreover, it was found that this cathode active material does not have lithium deficiency on the surface thereof, so when using this cathode active material to form a non-aqueous electrolyte secondary battery, it is possible to reduce the cathode resistance of the secondary battery and to improve the output characteristics. The present invention was invented based on these findings.

The details of the present invention is explained hereinafter by dividing it into three sections of (1) Manufacturing Method for Cathode Active Material for Non-Aqueous Electrolyte Secondary Battery, (2) Cathode Active Material for Non-aqueous Electrolyte Secondary Battery, and (3) Non-aqueous Electrolyte Secondary Battery (1) Manufacturing Method for Cathode Active Material for Non-Aqueous Electrolyte Secondary Battery The manufacturing method for a cathode active material for a non-aqueous electrolyte secondary battery of the present invention has a process of forming a 500 g/L to 2000 g/L slurry by adding water to a powder of a lithium nickel composite oxide that is expressed by the general formula (A): $Li_zNi_{1-x-y}Co_xM_yO_2$ (where $0.10 \leq x \leq 0.20$, $0 \leq y \leq 0.10$, $0.97 \leq z \leq 1.20$, and M is at least one element that is selected from among Mn, V, Mg, Mo, Nb, Ti and Al), then washing lithium nickel composite oxide by stirring the slurry, and after filtering, performing heat treatment in an oxygen atmosphere having an oxygen content of 80% by volume or more, and at a temperature of no less than 120° C. and no greater than 550° C.

(1-a) Base Material

[Composition]

The cathode active material that is obtained according to the present invention is expressed by the general formula (B): $Li_zNi_{1-x-y}Co_xM_yO_2$ (where $0.10 \leq x \leq 0.20$, $0 \leq y \leq 0.10$, $0.95 \leq z \leq 1.10$, and M is at least one element that is selected from among Mn, V, Mg, Mo, Nb, Ti and Al). However, depending on the conditions during washing, lithium (Li) may elute in the wash water, so in that case, it is necessary to use a lithium nickel composite oxide that is expressed by the general formula (A) above.

In other words, lithium nickel composite oxide having a lithium content that is the same or a little more than the target cathode active material is used as the base material. More specifically, lithium nickel composite oxide that in the general formula (A), the value of z that expresses the lithium content is 0.97 to 1.20, and preferably 0.98 to 1.15, and even more preferably 1.00 to 1.08 is used. When the value of z is less than 0.97, the cathode resistance of the non-aqueous electrolyte secondary battery that uses the obtained cathode active material becomes large, and thus it is not possible to sufficiently improve the output characteristics. On the other hand, when the value of z is greater than 1.20, not only does the initial discharge capacity of the cathode active material decrease, the cathode resistance similarly becomes large.

[Particle Structure]

The structure of the lithium nickel composite oxide of the base material, from the aspect of increasing the contact surface area with the electrolyte, is preferably in the form of secondary particles that are formed by an aggregation of plural primary particles of a lithium nickel composite oxide that is represented by the general formula (A). Particularly, from the aspect of forming secondary particles having gaps and boundaries into which electrolyte can penetrate, preferably secondary particles that are formed by an aggregation of plural plate shaped and/or needle shaped primary particles are used.

[Average Particle Size]

The average particle size of the lithium nickel composite oxide base material is preferably controlled to be within the range 3 μm to 30 μm, and more preferably within the range 5 μm to 20 μm. By using a lithium nickel composite oxide having such an average particle size as the base material, it is possible to improve the packing density of the obtained cathode active material, and it is possible to increase the number of contact points between the cathode active material, and thus it is possible to further improve the output characteristics and battery capacity. In this specification, as the average particle size of the lithium nickel composite oxide, the mean volume diameter thereof is used that can be calculated, for example, from the volume integrated average value measured using the laser diffraction scattering method.

[Specific Surface Area]

The specific surface area of the lithium nickel composite oxide of the base material is basically passed on to the specific surface area of the cathode active material that is obtained with this lithium nickel composite oxide as a precursor. Therefore, as the lithium nickel composite oxide of the base material, preferably a lithium nickel composite oxide that has a specific surface area within the range of 0.2 $g/m^2$ to 2.0 $g/m^2$, and more preferably within the range 0.2 $g/m^2$ to 1.8 $g/m^2$, and even more preferably within the range 0.2 $g/m^2$ to 1.6 $g/m^2$ is used. As a result, it is possible to easily control the specific surface area of the cathode active material that is obtained within a suitable range. The specific surface area can be measured by the BET method using nitrogen gas adsorption.

(1-b) Washing Process

The washing process is a process for removing impurities such as lithium carbonate and lithium sulfate that exist on the surface of the lithium nickel composite oxide by dispersing powder of lithium nickel composite oxide in water to form a slurry, and stirring the slurry.

During this kind of washing process, particles that exist on the surface of the lithium nickel composite oxide are peeled away, however, by stirring during the washing process, particles adhere again to the surface and cover the lithium nickel composite oxide. To explain this in more detail, when the washed lithium nickel composite oxide is composed of primary particles, the lithium nickel composite oxide that exist on or near the surface of the primary particles is peeled away in the shape of minute particles, and then adhere to the surface again and cover the surface of the primary particles. Moreover, when washed lithium nickel composite oxide is composed of secondary particles, the primary particles on the surface are peeled away and adhere again to the surface to cover the surface of the secondary particles.

In the washing process, part of the lithium is eluted from the surface of the lithium nickel composite oxide, and a small amount of lithium deficiency occurs, however, by performing a heat-treatment process as will be described later, the deficient lithium will be supplemented from the inside of the crystal.

[Slurry Concentration]

The slurry concentration when washing the lithium nickel composite oxide is 500 g/L to 2000 g/L, and preferably 600 g/L to 1800 g/L, and more preferably 700 g/L to 1500 g/L. When the slurry concentration is less than 500 g/L, the amount of lithium that is eluted from the lithium nickel composite oxide increases, and desorption of the lithium from the crystal lattice of the lithium nickel composite oxide becomes excessive, so it becomes easy for the crystal structure to break apart. Moreover, the aqueous solution having a high pH absorbs the carbon dioxide gas in the atmosphere, so it becomes easy for lithium carbonate to precipitate out. On the other hand, when the slurry concentration is greater than 2000 g/L, the viscosity of the slurry become extremely high, so stirring becomes difficult. Moreover, the alkali concentration in the slurry becomes high, and the rate of dissolution of adhering matter on the surface of the cathode active material becomes slow due to equilibrium, and so solid-liquid separation also becomes difficult.

[Water Temperature]

The temperature of the water used in the washing process is preferably 10° C. to 50° C., and more preferably 15° C. to 40° C., and even more preferably 20° C. to 30° C. When the water temperature is less than 10° C., it may not be possible to sufficiently remove the impurities. On the other hand, when the water temperature is greater than 50° C., the amount of eluted lithium increases, so the characteristics of the non-aqueous electrolyte battery that is obtained may decrease.

The water that is used in the washing process is not particularly limited, however, from the aspect of preventing a decrease in the battery characteristics due to impurities adhering to the cathode active material, preferably pure water is used. Particularly, using pure water having electrical conductivity of less than 10 μS/cm is preferred, and using pure water having electrical conductivity of 1 μS/cm or less is more preferred.

[Average Particle Size of Primary Particles]

During washing, the average particle size of minute particle shaped lithium nickel composite oxide that is peeled away from the surface of primary particles, and the average particle size of primary particles that are peeled away from the surface of secondary particles (hereafter, these will simply be referred to as "minute particles") is preferably 1 nm to 100 nm, and more preferably 5 nm to 50 nm. When the average particle size of the minute particles is less than 1 nm, the fine particles may not have sufficient lithium-ion conductivity. On the other hand, when the average particle size of minute particles is greater than 100 nm, it becomes difficult to uniformly cover the surface lithium nickel composite oxide, and therefore the uniform coating layer is not formed, thus there is a possibility that sufficient effect for reducing the reaction resistance is not obtained. In this specification, also as the average particle size of the minute particles, the mean volume diameter thereof is used that can be calculated for example, from the volume integrated average value measured using the laser diffraction scattering method.

[Filtration]

Filtration that is performed after the washing process is not particularly limited and it is possible to use any known method. As the filtration method, it is possible to use a method that uses a filter press, Nutsche (Buchner funnel) or the like.

(1-c) Heat-Treatment Process

The heat-treatment process is a process of heat treating the lithium nickel composite oxide under specified conditions after washing and filtering. Particularly, in the present invention, this heat-treatment process is performed in an atmosphere having an oxygen content of 80% by volume or more, and at a temperature of no less than 120° C. and no more than 550° C.

By performing this kind of heat treatment, lithium that exists inside the lithium nickel composite oxide is dispersed, the lithium deficiency on the surface is supplemented, and resintering proceeds. As a result, a coating layer having a high concentration of lithium is formed, so it is possible to improve the particle strength and weather resistance. Moreover, when making a non-aqueous electrolyte secondary battery that uses this lithium nickel composite oxide as cathode active material, a lithium-ion conduction path is formed at the boundary surface between the cathode active material and the electrolyte, so it is possible to reduce the reaction resistance and improve the output characteristics of the battery.

In the present invention, the heat-treatment method is not particularly limited, and it is possible to use a known method. However, from the aspect of forming a uniform coating layer on the lithium nickel composite oxide, preferably an electric furnace is used.

[Heat-Treatment Atmosphere]

The atmosphere during the heat-treatment process is an oxygen atmosphere having an oxygen concentration of 80% by volume or greater, and preferably 90% by volume or greater, and more preferably 100% by volume. When the oxygen concentration is less than 80% by volume, not only does the crystal structure break apart due to cationic mixing, but there is also a possibility that the supplementation of lithium to sites where there is lithium deficiency will not be performed sufficiently.

[Heat-Treatment Temperature]

The heat-treatment temperature is not less than 120° C. and not more than 550° C., and is preferably 120° C. or greater but less than 400° C., and more preferably 200° C. or greater but less than 350° C. When the heat-treatment temperature is less than 120° C., a long amount of time is required for heat treatment, and the resintering of the particle surfaces does not proceed sufficiently, so it becomes difficult to form a coating layer that includes a high concentration of lithium. On the other hand, when the heat-treatment temperature is greater than 400° C., the thickness of the coating layer that is formed by sintering becomes 100 nm or greater, and even though the particle strength and the weather resistance is improved, in the charging state, it become easy for the crystal structure to break apart. Particularly, when the heat-treatment temperature is greater than 550° C., this tendency increases, and the battery characteristics decrease due to the breaking apart of the crystal structure.

[Rate of Temperature Rise]

The rate of temperature rise during heat treatment is preferably 2° C./min to 10° C./min, and more preferably 4° C./min to 6° C./min. By regulating the rate of temperature rise during heat treatment to such a range, it is possible to suppress the occurrence of oxyhydroxides due to the reaction between the moisture remaining inside the lithium nickel composite oxide and the lithium on the surface of the lithium nickel composite oxide, so it becomes possible to prevent a decrease in the electrical conductivity of the obtained lithium nickel composite oxide. When the rate of temperature increase is less than 2° C./min, there is a possibility of a worsening of productivity due to the amount of time required for heat treatment. On the other hand, when the rate of temperature increase is greater than 10° C./min, not only is it not possible to avoid the problem above, but there is also a possible of irregularity in the coating layer.

[Processing Time]

The processing time in the heat-treatment process is appropriately adjusted according to the amount of lithium nickel composite oxide being processed and the performance of the apparatus being used, and is not particularly limited. However, as will be described later, the moisture content of the cathode active material is preferably adjusted to be 0.2% by mass or less, and more preferably adjusted to be 0.1% by mass or less, and even more preferably adjusted to be 0.05% by mass or less.

(2) Cathode Active Material for Non-Aqueous Electrolyte Secondary Battery

The cathode active material for a non-aqueous electrolyte secondary battery of the present invention is formed using a layered hexagonal lithium nickel composite oxide that is expressed by the general formula (B): $Li_zNi_{1-x-y}Co_xM_yO_2$ (where $0.10 \leq x \leq 0.20$, $0 \leq y \leq 0.10$, $0.95 \leq z \leq 1.10$, and M is at least one element that is selected from among Mn, V, Mg, Mo, Nb, Ti and Al). A coating layer that includes a high concentration of lithium is formed on the surface of this cathode active material, and the composition ratio (Li/Me)

of lithium (Li) with respect to the metals other than lithium (Me=Ni, Co, Mn, V and the like) of this coating layer is 1.50 to 2.30.

This kind of cathode active material is obtained by the manufacturing method described above, and there is no lithium deficiency in the coating layer of the surface thereof. Therefore, when making a non-aqueous electrolyte secondary battery that uses this cathode active material, it is possible to improve the initial discharge capacity and output characteristics of the battery. Moreover, due to the coating layer, this cathode active material has high particle strength and good weather resistance, and it is possible to maintain the battery characteristics over a long period of time.

(2-a) Composition

The value z that expresses the composition ratio of lithium (Li) is controlled to be within the range 0.95 to 1.10, and preferably 0.98 to 1.10, and more preferably 1.00 to 1.08. When the value of z is less than 0.95, the reaction resistance of the cathode in the non-aqueous electrolyte secondary battery becomes large, and it is not possible to improve the output characteristics. On the other hand, when the value of z is greater than 1.10, the initial discharge capacity of the non-aqueous electrolyte secondary battery decreases.

However, in the coating layer, the composition ratio (Li/Me) of lithium with respect to the metal other than lithium must be controlled to be with in the range 1.50 to 2.30, and preferably 1.60 to 2.20 and even more preferably 1.80 to 2.00. When the value of the ratio Li/Me is less than 1.50, not only does lithium deficiency occur on the surface of the cathode active material, but hydrogen is arranged in sites where lithium should be arranged, so the lithium-ion conduction paths are impaired, the reaction resistance increases, and there is a possibility that sufficient output characteristics will not be obtained. On the other hand, when the value of the ratio Li/Me is greater than 2.30, there is a possibility to occur a problem such as reduction of charge and discharge efficiency.

Cobalt (Co) is an added element that contributes to the improvement of the cycling characteristic. The value x that expresses the composition ratio of cobalt is controlled to be within the range 0.10 to 0.20, and preferably 0.13 to 0.17. When the value of x is less than 0.10, it is not possible to obtain a sufficient cycling characteristic, and the capacity retention greatly decreases. On the other hand, when the value x is greater than 0.20, the initial discharge capacity is significantly reduced.

Moreover, the cathode active material of the present invention can also include added elements (M) according to other uses. As a result, it is possible to improve the durability and cycling characteristic of the obtained non-aqueous electrolyte secondary battery.

As the added element (M), it is possible to use at least one element selected from among manganese (Mn), vanadium (V), magnesium (Mg), molybdenum (Mo), niobium (Nb), titanium (Ti) and aluminum (Al). These added elements (M) are appropriately selected according to the performance required for the secondary battery that uses the obtained cathode active material.

The value y that indicates the amount of added element (M) included is 0.10 or less and preferably 0.06 or less. When the value of y is greater than 0.10, the metal elements that contribute to the Redox reaction decrease, so the battery capacity decreases.

The composition ratio described above can be measured by quantitative analysis or semi-quantitative analysis, and more specifically, can be measured by an X-ray photoelectron spectroscopy method or the like.

(2-b) Particle Structure

The cathode active material of the present invention includes a high concentration of lithium on the surface thereof, and is characterized by comprising a coating layer that has no lithium deficiency. Due to the existence of this coating layer, it is possible to dramatically improve the particle strength and the weather resistance. Moreover, when making a non-aqueous electrolyte secondary battery that uses this cathode active material, it is possible to greatly improve the initial discharge amount and the output characteristics. Whether or not there is lithium deficiency in the coating layer can be checked by X-ray photoelectron spectroscopy.

The thickness of this coating layer is preferably controlled to be within the range of 1 nm to 100 nm, and more preferably 5 nm to 50 nm, and even more preferably 10 nm to 30 nm. When the thickness of the coating layer is less than 1 nm, it is not possible to sufficiently improve the particle strength and the weather resistance. On the other hand, when the thickness is greater than 100 nm, a problem occurs in that in the charged state, it becomes easy for the crystal structure to break apart, and there is a possibility that the battery characteristics will decrease. The thickness of the coating layer can be determined with a cross-section observation of the cathode active material using a scanning electron microscope (SEM) in a state that the cathode active material is embedded in a resin and then is ready to be observed using a cross-section polisher processing or the like. More specifically, the thickness can be determined by measuring the thickness of the coating layer at 30 or more locations using SEM observation, and calculating the average value.

The cathode active material of the present invention can also comprise primary particles of the lithium nickel composite oxide that is represented by the general formula (B) above, and/or secondary particles that are formed by an aggregation of these primary particles. However, from the aspect of improving the output characteristics by increasing the contact surface area with the electrolyte, preferably the cathode active material comprises secondary particles, and particularly it is preferred that the cathode active material comprise secondary particles that have gaps or grain boundaries in which electrolyte can penetrate. The structure of the cathode active material can be checked by SEM observation of the cross section of the cathode active material.

(2-c) Average Particle Size

The average particle size of the cathode active material is preferably within the range 3 μm to 30 μm, and more preferably within the range 5 μm to 20 μm. Cathode active material having an average particle size that is within the range above has high packing density, and thus it is possible to further improve the characteristics such as battery capacity of the secondary battery that uses this cathode material. In this specification, also as the average particle size of the cathode active material, the mean volume diameter thereof is used that can be calculated, for example, from the volume integrated average value measured using the laser diffraction scattering method.

(2-d) Moisture Content

After the heat-treatment process, the ratio of the mass of the moisture that is included in the cathode active material with respect to the total mass of the cathode active material (hereafter, referred to as the "moisture content") is preferably 0.2% by mass or less, and more preferably 0.1% by mass or less, and even more preferably, 0.05% by mass. When the moisture content of the cathode active material is greater than 0.2% by mass, the moisture absorbs the gas component, including the carbon and sulfur in the air, and there is a possibility that a lithium compound will be generated on the surface of the cathode active material.

Measurement of the moisture content is not particularly limited, and can be performed using known methods. As such a method, for example, it is possible to measure the moisture content by using a Karl Fischer moisture titrate, or the like.

(2-e) Specific Surface Area

The specific surface area of the cathode active material after the heat-treatment process is preferably controlled to be 0.2 $g/m^2$ to 2.0 $g/m^2$, and more preferably 0.2 $g/m^2$ to 1.8 $g/m^2$, and even more preferably 0.2 $g/m^2$ to 1.6 $g/m^2$. When the specific surface area is less than 0.2 $g/m^2$, the cathode resistance increases, and it is not possible to improve the output characteristics. On the other hand, when the specific surface area is greater than 2.0 $g/m^2$, the amount of heat generated due to reaction with the electrolyte suddenly increases, and there is a possibility that the thermal stability will decrease. The specific surface area can be measured by the BET method using nitrogen gas adsorption.

(2-f) Particle Strength

The cathode active material of the present invention preferably has particle strength of 42 MPa or greater, and more preferably particle strength of 54 MPa or greater, and even more preferably particle strength of 57 MPa or greater. When the particle strength is less than 42 MPa, the cathode active material deforms or breaks when being rolled to form the electrode, so there is a possibility that a highly dense electrode cannot be formed. The particle strength can be measured by a micro-compression tester.

(2-g) Weather Resistance

The cathode active material of the present invention preferably has a moisture content of less than 1.1% by mass, and more preferably 0.9% by mass or less, and even more preferably 0.7% by mass or less after 5 days of exposure in an air atmosphere. Moreover, preferably the total carbon amount (total carbon content) is less than 0.6% by mass, and more preferably 0.5% by mass or less, or even more preferably 0.4% by mass or less. Cathode active material having a moisture content and total carbon amount within such ranges has excellent weather resistance and does not easily change due to gas in the atmosphere, so it is possible to make the storage ability of the obtained non-aqueous electrolyte secondary battery high. The moisture content can be measured by a Karl Fischer moisture titrate, and the total carbon amount can be measured by a total organic carbon analyzer.

(3) Non-Aqueous Electrolyte Secondary Battery

The non-aqueous electrolyte secondary battery of the present invention has a cathode, an anode, a separator and non-aqueous electrolyte, and the cathode active material of the present invention is used as the cathode material for the cathode.

In the following, the non-aqueous electrolyte secondary battery of the present invention will be explained. However, the embodiment explained below is only an example, and it is possible for the non-aqueous electrolyte secondary battery of the present invention to undergo various changes or improvements based on the embodiments disclosed in this specification and based on the knowledge of one skilled in the art. Moreover, in the explanation below, the use of the non-aqueous electrolyte secondary battery of the present invention is not particularly limited.

(3-a) Cathode

First, the cathode, which is a feature of the secondary battery of the present invention, will be explained.

The cathode of the non-aqueous electrolyte secondary battery is made as described below using the cathode active material for a non-aqueous electrolyte secondary battery that is obtained according to the present invention.

First, a cathode paste is made by mixing a conductive material and bonding agent with powdered cathode active material that was obtained according to the present invention, and then kneading this mixture. The respective mixture ratios in the cathode paste at this time are also important elements for determining the performance of the non-aqueous electrolyte secondary battery. When the solid portion of the cathode material without the solvent is taken to be 100 parts by mass, then, as in the case of a general cathode of a non-aqueous electrolyte secondary battery, the amount of cathode active material that is included is taken to be 60 parts by mass to 95 parts by mass, the amount of conductive material that is ided is taken to be 1 part by mass to 20 parts by mass, and the amount of bonding agent included is taken to be 1 part by mass to 20 parts by mass.

The obtained cathode paste is applied, for example, on the surface of an aluminum foil current collector, and then dried to cause the solvent to dissipate. When necessary, it is possible to apply pressure with a roll press to increase the electrode density. In this way, it is possible to make a sheet-shaped cathode. A sheet-shaped cathode can be provided for making a battery by cutting the cathode to a size suitable for the target battery. However, manufacturing the cathode is not limited to this kind of method, and it is possible to manufacture the cathode by some other method.

When manufacturing the cathode, it is possible to use graphite (natural graphite, artificial graphite, expanded graphite, and the like), or a carbon black material such as acetylene black, Ketjenblack and the like as the conductive material.

Moreover, it is possible to use polyvinylidene fluoride (PVDF), polytetrafluoroethylene (PTFE), fluororubber, ethylene propylene diene rubber, styrene butadiene, cellulose resin, polyacrylic acid and the like as the bonding agent.

When necessary, it is also possible to add a solvent for dissolving the cathode active material, the conductive material and the bonding agent. It is possible to use, for example, an organic solvent such as N-methyl-2-pyrrolidone and the like as the solvent. Furthermore, it is also possible to add activated carbon in order to increase the electric double-layer capacity.

(3-b) Anode

For the anode, it is possible to use an anode that is formed by mixing a binding agent with metal lithium, lithium alloy or the like, or with an anode active material for which adsorption or desorption of lithium ions is possible, adding a suitable solvent to form a paste-like anode material, applying that anode material onto the surface of a metal foil, for example copper foil current collector, drying and when necessary, applying pressure to increase the electrode density.

As the anode active material, it is possible to use an organic compound sintered body such as natural graphite, artificial graphite, phenol resin and the like, or powdered carbon material such as coke. In this case, as the anode binding agent, as in the case of the cathode, it is possible to use a fluororesin that includes PVDF and the like, and as the solvent for dispersing the active material and the binding agent, it is possible to use an organic solvent such as N-methyl-2-pyrrolidone and the like.

(3-c) Separator

The separator is arranged so as to be held between the cathode and the anode, and has the function of separating the cathode and the anode and maintaining the electrolyte. As such a separator, it is possible to use, for example, a thin film of polyethylene, polypropylene and the like, having many fine holes, however, the separator is not particularly limited as long as it has the functions described above.

(3-d) Non-Aqueous Electrolyte

The non-aqueous electrolyte is formed by dissolving lithium salt as a supporting salt into an organic solvent.

As the organic solvent, it is possible to use a single kind or a mixture of two or more kinds selected from: a cyclic carbonate such as ethylene carbonate, propylene carbonate, butylene carbonate, trifluoro propylene carbonate and the like; a chain carbonate such as diethyl carbonate, dimethyl carbonate, ethyl methyl carbonate, dipropyl carbonate and the like; an ether compound such as tetrahydrofuran, 2-methyltetrahydrofuran, dimethoxyethane and the like; a sulfur compound such as ethyl methyl sulfone, butane sultone and the like; and a phosphorus compound such as triethyl phosphate, trioctyl phosphate and the like.

As the supporting salt, it is possible to use $LiPF_6$, $LiBF_4$, $LiClO_4$, $LiAsF_6$, $LiN(CF_3SO_2)_2$ and the like, or a composite of these.

Furthermore, the non-aqueous electrolyte can also include a radical scavenger, a surfactant, a flame retardant and the like.

(3-e) Battery Shape and Construction

Various shapes such as a cylindrical shape or layered shape can be used as the shape of the non-aqueous electrolyte secondary battery of the present invention that is formed using the cathode, anode, separator and non-aqueous electrolyte explained above.

No matter what shape is used, electrodes are formed by layering the cathode and anode by way of the separator, and the electrodes are then impregnated with the non-aqueous electrolyte, then collector leads or the like are used to connect between the cathode collector and a cathode terminal that goes to the outside, and between the anode collector and an anode terminal that goes to the outside; this is then sealed in a battery case to complete the non-aqueous electrolyte secondary battery.

(3-f) Characteristics

Figure 1:
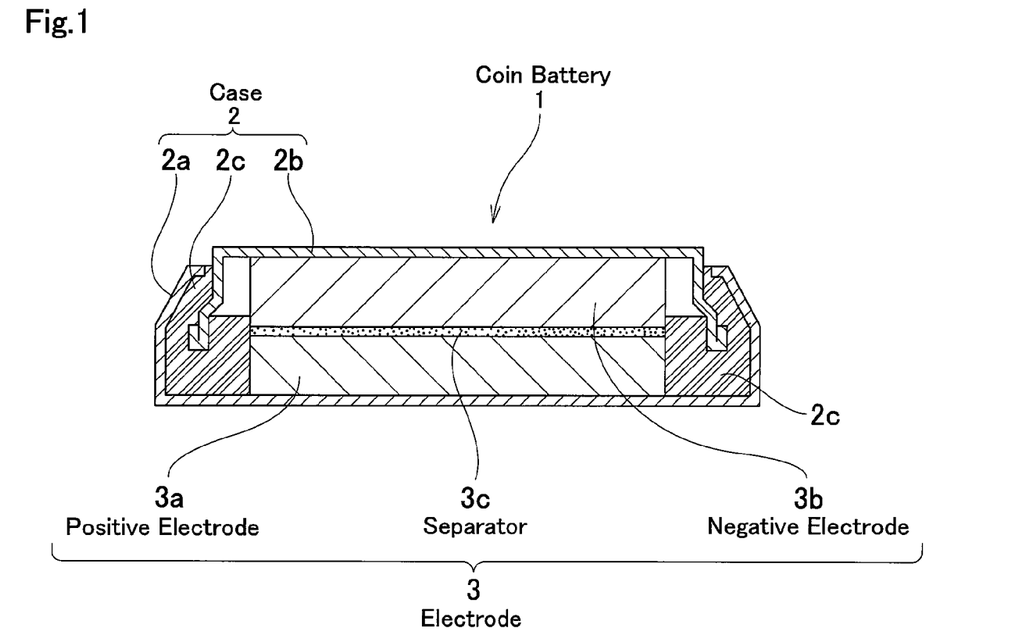
FIG. 1 is a cross-sectional view of a 2032-type coin battery that was used for evaluation.

The non-aqueous electrolyte secondary battery of the present invention is constructed as described above and has a cathode that uses the cathode active material of the present invention, so it is possible to achieve high initial discharge capacity and low cathode resistance. For example, in the case of constructing a 2032 type coin battery such as illustrated in FIG. 1 using the cathode active material of the present invention, it is possible to achieve an initial discharge capacity of 190 mAh/g or more, and preferably 195 mAh/g or more, and even more preferably 197 mAh/g or more. Moreover, it is possible to achieve a cathode resistance of 5.5Ω or less, and preferably 5.0Ω or less, and even more preferably 4.3Ω or less. Furthermore, the cathode active material of the present invention has high particle strength, and excellent weather resistance, so the non-aqueous electrolyte secondary battery that uses this cathode active material is capable of maintaining the battery characteristics over a long period of time.

EXAMPLES

In the following, the present invention will be explained in detail using examples and comparative examples. However, it should be understood that the present invention is not limited to the specific details of these examples and comparative examples. In the example and comparative examples below, unless stated otherwise, samples using special grade chemicals manufactured by Wako Pure Chemical Industries Co., Ltd. were used for manufacturing the lithium nickel composite oxide, the cathode active material and the secondary battery.

Example 1

Lithium nickel composite oxide powder that is represented by the general formula; $Li_{1.06}Ni_{0.82}Co_{0.15}Al_{0.03}O_2$ that was obtained by mixing oxide powder having nickel as the main component and lithium hydroxide and then sintering the resultant mixture, was used as the base material of the cathode active material. This lithium nickel composite oxide powder comprised lithium nickel composite oxide that was represented by the general formula above, and comprised secondary particles that were formed by an aggregation of plural plate shaped and/or needle shaped primary particles having an average particle size of 0.3 μm. Moreover, the average particle size of this lithium nickel composite oxide powder was 12.0 μm, and the specific surface area was 1.2 m²/g. The construction of this lithium nickel composite oxide was observed by SEM (JSM-6360LA, manufactured by JEOL Ltd.), the average particle size was measured using the volume integrated average value in the laser diffraction scattering method, and the specific surface area was measured by the BET method using nitrogen gas adsorption.

A slurry was formed by adding pure water having electric conductivity of 5 μS/cm (temperature: 22° C.) to the lithium nickel composite oxide, the slurry was washed by stirring for 30 minutes, after which the slurry was filtered using a Nutsche. The slurry concentration at this time was 1500 g/L. Moreover, the surface of the lithium nickel composite oxide at this time was observed by SEM, and as a result, it was confirmed that there were minute particles having an average particle size of 30 nm on the surface.

After that, heat treatment was performed by using a muffle furnace (PVF-3060, manufactured by Hirochiku Co., Ltd.) was used in an oxygen atmosphere having an oxygen concentration of 100% by volume to raise the temperature to 210° C. at a rate of temperature increase of 5° C./min, and that temperature was maintained until the moisture content became 0.05% by mass. At this time, the processing time from the start of temperature rising to the end of temperature keeping at the above temperature was 14 hours.

[Characteristics of Cathode Active Material]

The characteristics of the obtained cathode active material were confirmed to be as described below.

a) Composition

As a result of measurement using an X-ray diffractometer (Multi Flex, manufactured by Rigaku Corp.), it was confirmed that the cathode active material that was obtained in this way was a layered hexagonal lithium nickel composite oxide that is represented by the general formula $Li_{1.06}Ni_{0.82}Co_{0.15}Al_{0.03}O_2$.

b) Particle Structure

After the cathode active material was embedded in resin and then performing a cross-section polishing process on it, the cathode active material was observed by SEM observation. As a result, this cathode active material was confirmed to comprise secondary particles that are formed by an aggregation of plural primary particles. Moreover, the coating layer was observed by X-ray photoelectron spectroscopy measurement, and as a result it was confirmed that there was no lithium deficiency, and that Li/Me was 2.00.

c) Average Particle Size and Specific Surface Area

By performing measurement using a laser scattering type particle size analyzer (manufactured by Nikkiso Co., Ltd.), it was confirmed that the average particle size of this cathode active material was 12 μm. Moreover, as a result of measurement using the BET method by nitrogen gas adsorption, it was confirmed that the specific surface area of this cathode active material was 0.9 m$^2$/g.

[Evaluation of Cathode Active Material]

The a) particle strength and b) weather resistance of the obtained cathode active material were evaluated as described below.

a) Particle Strength

By performing measurement using a micro-compression tester (MCT-W series, manufactured by Shimadzu Corporation), it was confirmed that the particle strength of this cathode active material was 60 MPa.

In Examples 2 to 15 and Comparative Examples 1 to 7, the particle strength in Example 1 was taken to be 100, and with this value as a standard, it was determined that when the relative value was less than 70 (particle strength of less then 42 MPa) the strength was insufficient.

b) Weather Resistance Test

After the cathode active material had been exposed in an air atmosphere for 5 days, a sample was taken, and evaluated by measuring the moisture content and the total carbon amount (overall carbon content) at that time. The moisture content was measured with a Karl Fischer moisture meter (CA-100, manufactured by Mitsubishi Chemical Corporation), and the total carbon amount was measured by high-frequency combustion infrared analysis (CS-600, manufactured by LECO Japan Corporation). As a result, it was found that the moisture content of Example 1 was 0.7% by mass, and the total carbon amount was 0.4% by mass.

In Examples 2 to 15 and Comparative Examples 1 to 7 described below, the values for the moisture content and total carbon amount in Example 1 are taken to be 100, and with these values as standards, it was determined that when relative values are 150 or more (moisture content of 1.1% by mass or greater, or a total carbon amount of 0.6% by mass or greater) the weather resistance has decreased.

[Manufacture of Non-Aqueous Electrolyte Secondary Battery]

Next, a coin battery 1 as illustrated in FIG. 1 was manufactured using the obtained cathode active material, and the characteristics were evaluated.

This coin battery 1 comprises a case 2, and electrode 3 that is housed inside this case 2.

The case 2 has a cathode can 2a that is hollow and that is opened on one end, and an anode can 2b that is arranged in the opening section of this cathode can 2a, and is constructed so that when the anode can 2b is arranged in the opening section of the cathode can 2a, a space is formed between the anode can 2b and the cathode can 2a that houses the electrode 3.

The electrode 3 comprises a cathode 3a, a separator 3c and an anode 3b, that are layered in that order, and housed in the case 2 so that the cathode 3a comes in contact with the inner surface of the cathode can 2a, and the anode 3b comes in contact with the inner surface of the anode can 2b.

The case 2 comprises a gasket 2c, and is secured by this gasket 2c so that the cathode 2a and anode 2b are maintained in an electrically insulated state. Moreover, the gasket 2c has a function of sealing the gap between the cathode can 2a and anode can 2b so that the inside of the case 2 is sealed off from the outside so as to be airtight and fluid-tight.

The coin battery 1 was manufactured as described below. First, the 52.5 mg of the obtained cathode active material was mixed with 15 mg of acetylene black and 7.5 mg of polytetrafluoroethylene resin, then pressed at a pressure of 100 MPa to form a cathode having an 11 mm diameter and 100 μm thickness. This cathode 3a was then dried in a vacuum drier for 12 hours at 120° C. Using this cathode 3a, anode 3b, separator 3c and electrolyte, a coin battery 1 was manufactured inside a glovebox in an Ar atmosphere, the dew point of which was controlled to −80° C.

An anode sheet that was formed by coating copper foil with graphite powder and polyvinylidene fluoride and punched into a disk shape having a 14 mm diameter was used as the anode 3b. Moreover, porous polyethylene film having a film thickness of 25 m was used as the separator 3c. 1 M of a mixed solution having equal parts of ethylene carbonate (EC) and diethyl carbonate (DEC) and LiClO$_4$ as the supporting electrolyte (manufactured by Tomiyama Pure Chemical Industries, Ltd.) was used as the electrolyte.

[Evaluation of Electrical Characteristics]

The a) initial discharge capacity and b) cathode resistance of obtained coin battery 1 were evaluated as described below.

a) Initial Discharge Capacity

After making the coin battery 1, the coin battery 1 was left for 24 hours, and after the open circuit voltage (OCV) became stable, the coin battery 1 was charged to a cut-off voltage of 4.3 V with the current density with respect to the cathode being 0.1 mA/cm$^2$, and after stopping for one hour, the coin battery 1 was discharged to a cut-off voltage of 3.0 V and the capacity at that time was evaluated as being the initial discharge capacity. As a result, it was found that the initial discharge capacity of Example 1 was 198.8 mAh/g.

b) Cathode Resistance (Rct)

Figure 2:
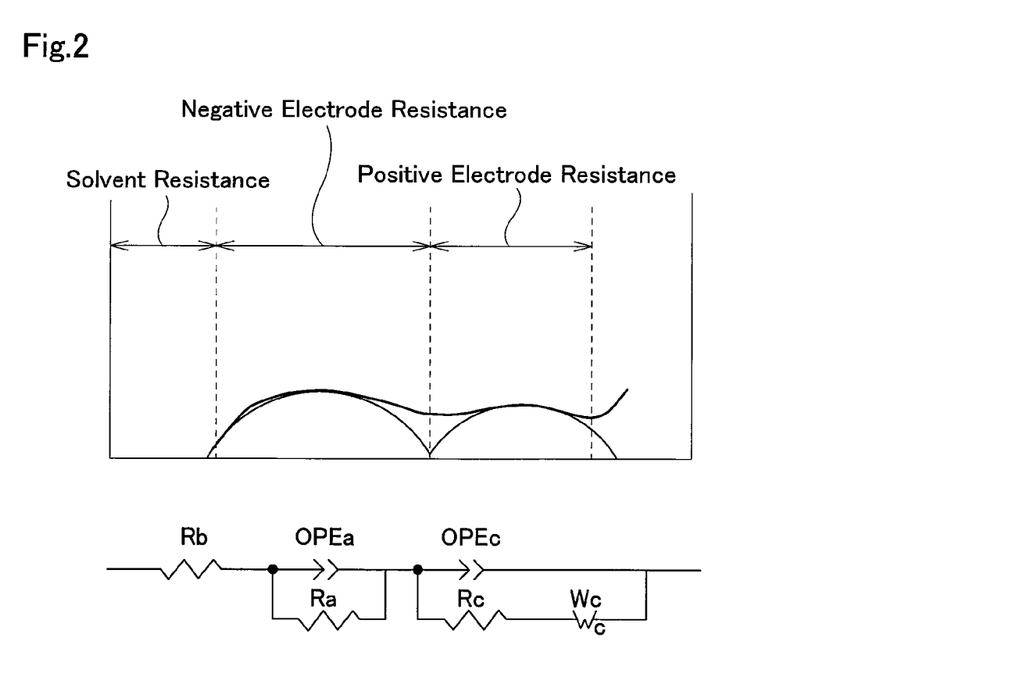
FIG. 2 is a drawing for explaining an equivalent circuit that was used for measurement and analysis in impedance evaluation.

The coin battery 1 was charged to a charge potential of 4.1 V, and by using a frequency response analyzer and a potentio-galvanostat (1255B, manufactured by Solatron) to measure the resistance value by an alternating current impedance method, the Nyquist plot illustrated in FIG. 2 was obtained. This Nyquist plot is expressed as a sum of characteristic curves that indicate the solvent resistance, anode resistance and capacity, and cathode resistance and capacity, so the value of the cathode resistance was calculated by fitting calculation using an equivalent circuit based on this Nyquist plot. As a result, the cathode resistance in Example 1 was 3.9Ω.

In Examples 2 to 15 and Comparative Examples 1 to 7 below, the value of the cathode resistance in Example 1 is taken to be 100, then with this value as a standard, when the absolute value is greater than 141 (cathode resistance exceeds 5.5Ω), it is determined that the cathode resistance is high.

Example 2

Except for the slurry concentration during washing being 750 g/L, a cathode active material was obtained in the same way as in Example 1. The characteristics of this cathode active material are shown in Table 1. Moreover, evaluation of this cathode active material and a secondary battery that was made using this cathode active material is shown in Table 2.

Example 3

Except for the heat-treatment temperature being 500° C., a cathode active material was obtained in the same way as in Example 1. The characteristics of this cathode active material are shown in Table 1. Moreover, evaluation of this cathode active material and a secondary battery that was made using this cathode active material is shown in Table 2.

Example 4

Except for the atmosphere during heat-treatment being an oxygen atmosphere with an oxygen concentration of 80% by mass, a cathode active material was obtained in the same way as in Example 1. The characteristics of this cathode active material are shown in Table 1. Moreover, evaluation of this cathode active material and a secondary battery that was made using this cathode active material is shown in Table 2.

Example 5

Except for the heat-treatment temperature being 120° C., a cathode active material was obtained in the same way as in Example 1. The characteristics of this cathode active material are shown in Table 1. Moreover, evaluation of this cathode active material and a secondary battery that was made using this cathode active material is shown in Table 2.

Example 6

Except for the heat-treatment temperature being 350° C., a cathode active material was obtained in the same way as in Example 1. The characteristics of this cathode active material are shown in Table 1. Moreover, evaluation of this cathode active material and a secondary battery that was made using this cathode active material is shown in Table 2.

Example 7

Except for the heat-treatment temperature being 420° C., a cathode active material was obtained in the same way as in Example 1. The characteristics of this cathode active material are shown in Table 1. Moreover, evaluation of this cathode active material and a secondary battery that was made using this cathode active material is shown in Table 2.

Example 8

Except for temperature during washing being 10° C., a cathode active material was obtained in the same way as in Example 1. The characteristics of this cathode active material are shown in Table 1. Moreover, evaluation of this cathode active material and a secondary battery that was made using this cathode active material is shown in Table 2.

Example 9

Except for temperature during washing being 50° C., a cathode active material was obtained in the same way as in Example 1. The characteristics of this cathode active material are shown in Table 1. Moreover, evaluation of this cathode active material and a secondary battery that was made using this cathode active material is shown in Table 2.

Example 10

Except for the rate of temperature rise during heat treatment being 2° C./min, a cathode active material was obtained in the same way as in Example 1. The characteristics of this cathode active material are shown in Table 1. Moreover, evaluation of this cathode active material and a secondary battery that was made using this cathode active material is shown in Table 2.

Example 11

Except for the rate of temperature rise during heat treatment being 10° C./min, a cathode active material was obtained in the same way as in Example 1. The characteristics of this cathode active material are shown in Table 1. Moreover, evaluation of this cathode active material and a secondary battery that was made using this cathode active material is shown in Table 2.

Example 12

Except for the temperature during washing being 8° C., a cathode active material was obtained in the same way as in Example 1. The characteristics of this cathode active material are shown in Table 1. Moreover, evaluation of this cathode active material and a secondary battery that was made using this cathode active material is shown in Table 2.

Example 13

Except for the temperature during washing being 55° C., a cathode active material was obtained in the same way as in Example 1. The characteristics of this cathode active material are shown in Table 1. Moreover, evaluation of this cathode active material and a secondary battery that was made using this cathode active material is shown in Table 2.

Example 14

Except for the rate of temperature rise during heat treatment being 1° C./min, a cathode active material was obtained in the same way as in Example 1. The characteristics of this cathode active material are shown in Table 1. Moreover, evaluation of this cathode active material and a secondary battery that was made using this cathode active material is shown in Table 2.

Example 15

Except for the rate of temperature rise during heat treatment being 12° C./min, a cathode active material was obtained in the same way as in Example 1. The characteristics of this cathode active material are shown in Table 1. Moreover, evaluation of this cathode active material and a secondary battery that was made using this cathode active material is shown in Table 2.

Comparative Example 1

Except for the slurry concentration during washing being 2500 g/L, a cathode active material was obtained in the same way as in Example 1. The characteristics of this cathode active material are shown in Table 1. Moreover, evaluation of this cathode active material and a secondary battery that was made using this cathode active material is shown in Table 2.

Comparative Example 2

Except for the slurry concentration during washing being 400 g/L, a cathode active material was obtained in the same way as in Example 1. The characteristics of this cathode active material are shown in Table 1. Moreover, evaluation of this cathode active material and a secondary battery that was made using this cathode active material is shown in Table 2.

Comparative Example 3

Except for the heat-treatment temperature being 100° C., a cathode active material was obtained in the same way as in Example 1. The characteristics of this cathode active material are shown in Table 1. Moreover, evaluation of this cathode active material and a secondary battery that was made using this cathode active material is shown in Table 2.

Comparative Example 4

Except for the heat-treatment temperature being 700° C., a cathode active material was obtained in the same way as in Example 1. The characteristics of this cathode active material are shown in Table 1. Moreover, evaluation of this cathode active material and a secondary battery that was made using this cathode active material is shown in Table 2.

Comparative Example 5

Except for the atmosphere during heat-treatment being an oxygen atmosphere with an oxygen concentration of 50% by mass, a cathode active material was obtained in the same way as in Example 1. The characteristics of this cathode active material are shown in Table 1. Moreover, evaluation of this cathode active material and a secondary battery that was made using this cathode active material is shown in Table 2.

Comparative Example 6

Except for the atmosphere during heat-treatment being an air atmosphere, a cathode active material was obtained in the same way as in Example 1. The characteristics of this cathode active material are shown in Table 1. Moreover, evaluation of this cathode active material and a secondary battery that was made using this cathode active material is shown in Table 2.

Comparative Example 7

Except for the atmosphere during heat-treatment being a vacuum atmosphere, a cathode active material was obtained in the same way as in Example 1. The characteristics of this cathode active material are shown in Table 1. Moreover, evaluation of this cathode active material and a secondary battery that was made using this cathode active material is shown in Table 2.

TABLE 1

| | Washing Process | | Average particle size of minute particles (nm) | Heat-treatment process | | |
|---|---|---|---|---|---|---|
| | Water temperature (° C.) | Slurry concentration (g/L) | | Temperature (° C.) | Atmosphere ($O_2$ %) | Temperature rising rate (° C./min) |
| Example-1 | 22 | 1500 | 30 | 210 | 100 | 5 |
| Example-2 | 22 | 750 | 30 | 210 | 100 | 5 |
| Example-3 | 22 | 1500 | 50 | 500 | 100 | 5 |
| Example-4 | 22 | 1500 | 32 | 210 | 80 | 5 |
| Example-5 | 22 | 1500 | 17 | 120 | 100 | 5 |
| Example-6 | 22 | 1500 | 37 | 350 | 100 | 5 |
| Example-7 | 22 | 1500 | 48 | 420 | 100 | 5 |
| Example-8 | 10 | 1500 | 31 | 210 | 100 | 5 |
| Example-9 | 50 | 1500 | 32 | 210 | 100 | 5 |
| Example-10 | 22 | 1500 | 29 | 210 | 100 | 2 |
| Example-11 | 22 | 1500 | 30 | 210 | 100 | 10 |
| Example-12 | 8 | 1500 | 28 | 210 | 100 | 5 |
| Example-13 | 55 | 1500 | 30 | 210 | 100 | 5 |
| Example-14 | 22 | 1500 | 31 | 210 | 100 | 1 |
| Example-15 | 22 | 1500 | 30 | 210 | 100 | 12 |
| Comparative Example-1 | 22 | 2500 | 34 | 210 | 100 | 5 |
| Comparative Example-2 | 22 | 400 | 31 | 210 | 100 | 5 |
| Comparative Example-3 | 22 | 1500 | 4 | 100 | 100 | 5 |
| Comparative Example-4 | 22 | 1500 | 70 | 700 | 100 | 5 |
| Comparative Example-5 | 22 | 1500 | 29 | 210 | 50 | 5 |
| Comparative Example-6 | 22 | 1500 | 30 | 210 | Air | 5 |
| Comparative Example-7 | 22 | 1500 | 31 | 210 | Vacuum | 5 |

TABLE 1-continued

| | | | Positive electrode active material characteristics | | | | |
|---|---|---|---|---|---|---|---|
| | General formula | Crystal structure | Li deficiency | Li/Me | Specific surface area ($m^2/g$) | Average particle size (μm) | Moisture content (%) |
| Example-1 | $Li_{1.06}Ni_{0.82}Co_{0.15}Al_{0.03}O_2$ | Layered | NO | 2.00 | 0.9 | 12 | 0.05 |
| Example-2 | $Li_{1.06}Ni_{0.82}Co_{0.15}Al_{0.03}O_2$ | Layered | NO | 1.80 | 1.3 | 12 | 0.05 |
| Example-3 | $Li_{1.06}Ni_{0.82}Co_{0.15}Al_{0.03}O_2$ | Layered | NO | 2.10 | 0.3 | 12.8 | 0.05 |
| Example-4 | $Li_{1.06}Ni_{0.82}Co_{0.15}Al_{0.03}O_2$ | Layered | NO | 1.70 | 0.8 | 12 | 0.05 |
| Example-5 | $Li_{1.06}Ni_{0.82}Co_{0.15}Al_{0.03}O_2$ | Layered | NO | 1.90 | 1.5 | 12 | 0.05 |
| Example-6 | $Li_{1.06}Ni_{0.82}Co_{0.15}Al_{0.03}O_2$ | Layered | NO | 2.10 | 0.6 | 12.3 | 0.05 |
| Example-7 | $Li_{1.06}Ni_{0.82}Co_{0.15}Al_{0.03}O_2$ | Layered | NO | 2.21 | 0.5 | 12.5 | 0.05 |
| Example-8 | $Li_{1.06}Ni_{0.82}Co_{0.15}Al_{0.03}O_2$ | Layered | NO | 2.00 | 0.8 | 12 | 0.05 |
| Example-9 | $Li_{1.06}Ni_{0.82}Co_{0.15}Al_{0.03}O_2$ | Layered | NO | 1.60 | 1.4 | 12 | 0.05 |
| Example-10 | $Li_{1.06}Ni_{0.82}Co_{0.15}Al_{0.03}O_2$ | Layered | NO | 2.00 | 0.9 | 12 | 0.05 |
| Example-11 | $Li_{1.06}Ni_{0.82}Co_{0.15}Al_{0.03}O_2$ | Layered | NO | 2.00 | 0.9 | 12 | 0.05 |
| Example-12 | $Li_{1.06}Ni_{0.82}Co_{0.15}Al_{0.03}O_2$ | Layered | NO | 2.00 | 0.8 | 12 | 0.05 |
| Example-13 | $Li_{1.06}Ni_{0.82}Co_{0.15}Al_{0.03}O_2$ | Layered | NO | 1.50 | 1.6 | 12 | 0.05 |
| Example-14 | $Li_{1.06}Ni_{0.82}Co_{0.15}Al_{0.03}O_2$ | Layered | NO | 2.00 | 0.9 | 12 | 0.05 |
| Example-15 | $Li_{1.06}Ni_{0.82}Co_{0.15}Al_{0.03}O_2$ | Layered | NO | 2.00 | 0.9 | 12 | 0.05 |
| Comparative Example-1 | $Li_{1.06}Ni_{0.82}Co_{0.15}Al_{0.03}O_2$ | Layered | NO | 2.20 | 0.8 | 12 | 0.05 |
| Comparative Example-2 | $Li_{1.06}Ni_{0.82}Co_{0.15}Al_{0.03}O_2$ | Layered | Yes | 1.10 | 2.1 | 12 | 0.05 |
| Comparative Example-3 | $Li_{1.06}Ni_{0.82}Co_{0.15}Al_{0.03}O_2$ | Layered | NO | 1.20 | 1.8 | 12 | 0.05 |
| Comparative Example-4 | $Li_{1.06}Ni_{0.82}Co_{0.15}Al_{0.03}O_2$ | Layered | Yes | 1.40 | 0.1 | 13.2 | 0.05 |
| Comparative Example-5 | $Li_{1.06}Ni_{0.82}Co_{0.15}Al_{0.03}O_2$ | Layered | NO | 1.30 | 1.0 | 12 | 0.05 |
| Comparative Example-6 | $Li_{1.06}Ni_{0.82}Co_{0.15}Al_{0.03}O_2$ | Layered | NO | 1.00 | 0.9 | 12 | 0.05 |
| Comparative Example-7 | $Li_{1.06}Ni_{0.82}Co_{0.15}Al_{0.03}O_2$ | Layered | NO | 1.30 | 1.0 | 12 | 0.05 |

TABLE 2

| | Positive electrode active material | | | Secondary battery | |
|---|---|---|---|---|---|
| | Particle strength | Moisture content | Total carbon | Initial discharge capacity (mAh/g) | Positive electrode resistance |
| Example-1 | 100 | 100 | 100 | 198.8 | 100 |
| Example-2 | 99 | 99 | 95 | 199.2 | 110 |
| Example-3 | 152 | 78 | 80 | 195.4 | 95 |
| Example-4 | 99 | 96 | 110 | 197.6 | 117 |
| Example-5 | 72 | 112 | 108 | 194.2 | 109 |
| Example-6 | 121 | 91 | 91 | 196.3 | 98 |
| Example-7 | 138 | 83 | 84 | 195.6 | 96 |
| Example-8 | 100 | 99 | 97 | 198.5 | 92 |
| Example-9 | 99 | 98 | 96 | 198.0 | 105 |
| Example-10 | 98 | 102 | 91 | 198.9 | 93 |
| Example-11 | 92 | 91 | 89 | 197.9 | 112 |
| Example-12 | 95 | 102 | 106 | 196.2 | 102 |
| Example-13 | 83 | 110 | 112 | 192.1 | 141 |
| Example-14 | 98 | 101 | 91 | 199.0 | 98 |
| Example-15 | 110 | 113 | 128 | 193.4 | 109 |
| Comparative Example-1 | 100 | 98 | 103 | 185.2 | 105 |
| Comparative Example-2 | 50 | 189 | 192 | 186.6 | 148 |
| Comparative Example-3 | 52 | 115 | 114 | 180.1 | 134 |
| Comparative Example-4 | 184 | 60 | 50 | 166.0 | 165 |
| Comparative Example-5 | 100 | 110 | 105 | 188.8 | 152 |
| Comparative Example-6 | 98 | 101 | 115 | 180.5 | 172 |
| Comparative Example-7 | 99 | 101 | 102 | 194.4 | 155 |

[Evaluation]

As can be clearly seen from Table 2, the cathode active materials in Examples 1 to 15 are manufactured according to the manufacturing method of the present invention, so the particle strength is high and weather resistance is excellent. Moreover, when using these cathode active materials, a non-aqueous electrolyte secondary battery having a high initial discharge capacity and low cathode resistance was obtained.

However, in the case of the secondary batteries that used the cathode active materials of Examples 12 to 15, the water temperature in the washing process or the rate of temperature rise in the heat-treatment process were not within the preferable ranges of the present invention, so when compared with the other examples, there were cases in which the following problems occurred.

In Example 12, the water temperature during washing was lower and it was not possible to sufficiently remove impurities. Therefore, decomposition gas was generated due to unreacted lithium salt, and the battery dimensions were bad.

In Example 13, the water temperature during washing was high, and the amount of eluted lithium increased, so it was not possible to sufficiently improve the initial discharge amount or cathode resistance.

In Example 14, the rate of temperature rise during the heat-treatment process was slow, so productivity worsened.

In Example 15, the rate of temperature rise during the heat-treatment process was fast, so it was not possible to suppress the generation of oxyhydroxides, and thus it was not possible to sufficiently improve the initial discharge capacity. Moreover, the rate of temperature rise was fast, so a sufficient coating layer could not be generated, and the total carbon amount increased a little.

On the other hand, the Comparative Examples 1 to 7 are examples in which the slurry concentration, and the temperature and atmosphere during heat treatment were outside the range of the present invention.

In Comparative Example 1, the particle strength, weather resistance and cathode resistance were all equivalent with those in Examples 1 to 15, however, due to the slurry concentration during washing being high, the viscosity of the slurry became very high, which essentially made it difficult to perform production on an industrial scale. Moreover, the removal of impurities such as lithium carbonate that adhered to the cathode active material was insufficient, and due to that, it was not possible to sufficiently improve the initial discharge capacity.

In Comparative Example 2, the slurry concentration during washing was low, the amount of eluted lithium during the washing process increased, and lithium deficiency occurred. Therefore, it became easy for the crystal structure to break down, and the particle strength decreased. Moreover, as the lithium was eluted, the pH value of the water used in washing became high, carbonized gas in the air was absorbed, and lithium carbonate precipitated out again, so weather resistance decreased. Furthermore, the initial discharge capacity and cathode resistance also became worse.

In Comparative Example 3, the heat-treatment temperature was low, and a long time was required for heat treatment of the cathode active material after washing, so a difference (gradient) occurred in the lithium concentration on the surface of the particles and inside the particles, and as a result, the capacity and resistance became worse.

In Comparative Example 4, even though the particle strength and the weather resistance were good, the initial discharge capacity and cathode resistance became worse. This was probably due to the high heat-treatment temperature, and because transition metals were dissolved in lithium sites in the layered structure of the cathode active material.

In Comparative Example 5 to 7, the atmosphere during heat treatment was not suitable, and there was not the necessary oxygen concentration for lithium migration, and lithium on the crystal surface of the lithium nickel composite oxide was insufficient, so the cathode resistance worsened.

INDUSTRIAL APPLICABILITY

The manufacturing method of a cathode active material for a non-aqueous electrolyte secondary battery of the present invention was easy and suitable for large-scale production, so has large industrial value.

Moreover, the non-aqueous electrolyte secondary battery of the present invention is suitable as the power supply for compact and mobile electric devices (notebook personal computers, cell phones, and the like) that require a very high capacity. Furthermore, the non-aqueous electrolyte secondary battery of the present invention has excellent weather resistance, and can be made to be compact and have high output, so is also suitable as the power supply for transport equipment in which installation space is limited. The present invention can also be used as a power supply for an electric vehicle that is purely driven by electric power, as well as a power supply for a so-called hybrid automobile that is used together with a combustion engine such as a gasoline engine or diesel engine.

EXPLANATION OF REFERENCE NUMBERS

1 Coin battery
2 Case
2a Cathode can
2b Anode can
2c Gasket
3 Electrode
3a Cathode
3b Anode
3c Separator

What is claimed is:

1. A manufacturing method for manufacturing a cathode active material for a non-aqueous electrolyte secondary battery comprising steps of: preparing a powder of a lithium nickel composite oxide that is represented by a general formula (A): $Li_zNi_{1-x-y}Co_xM_yO_2$, wherein $0.10 \leq x \leq 0.20$, $0 \leq y \leq 0.10$, $0.97 \leq z \leq 1.20$, and M is at least one element that is selected from the group consisting of Mn, V, Mg, Mo, Nb, Ti and Al; forming a 500 g/L to 2000 g/L slurry by adding water to the powder; washing the slurry by mixing such that the particles that exist on a surface of the lithium composite oxide are peeled away and then the particles adhered again to the surface to cover the lithium composite oxide; filtering the slurry; and performing heat treatment to the powder after filtering at a temperature of no less than 120° C. and no greater than 550° C. in an oxygen atmosphere having an oxygen concentration of 80% by volume or more, to obtain a powder of a lithium nickel composite oxide that is represented by a general formula (B): $Li_zNi_{1-x-y}Co_xM_yO_2$, where $0.10 \leq x \leq 0.20$, $0 \leq y \leq 0.10$, $0.95 \leq z \leq 1.10$, and M is at least one element that is selected from the group consisting of Mn, V, Mg, Mo, Nb, Ti and Al, in which a coating layer that includes a high concentration of lithium is formed on the surface of the lithium nickel composite oxide.

2. The manufacturing method for manufacturing a cathode active material for a non-aqueous electrolyte secondary battery according to claim 1, wherein a temperature of the water that is used during the washing process is 10° C. to 50° C.

3. The manufacturing method for manufacturing a cathode active material for a non-aqueous electrolyte secondary battery according to claim 1, wherein the temperature during the heat treatment is 120° C. or greater but less than 400° C.

4. The manufacturing method for manufacturing a cathode active material for a non-aqueous electrolyte secondary battery according to claim 1, wherein a rate of temperature rise during the heat treatment is 2° C./min to 10° C./min.

5. The manufacturing method for manufacturing a cathode active material for a non-aqueous electrolyte secondary battery according to claim 1, wherein a moisture content of the cathode active material after the heat treatment is 0.2% by mass or less.

* * * * *